Aug. 8, 1961 J. F. KING 2,995,380
CAMERA DOLLY WITH ARCUATE AND CRAB STEERING
Filed July 2, 1957 3 Sheets-Sheet 1

INVENTOR.
JAMES F. KING
BY Edmond F. Shanahan
Attorney

Aug. 8, 1961 J. F. KING 2,995,380
CAMERA DOLLY WITH ARCUATE AND CRAB STEERING
Filed July 2, 1957 3 Sheets-Sheet 2
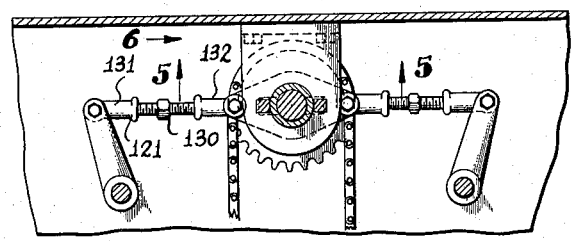
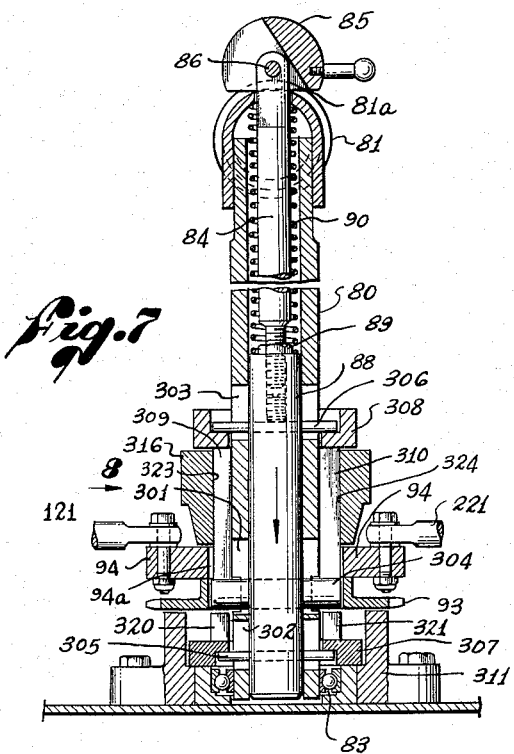
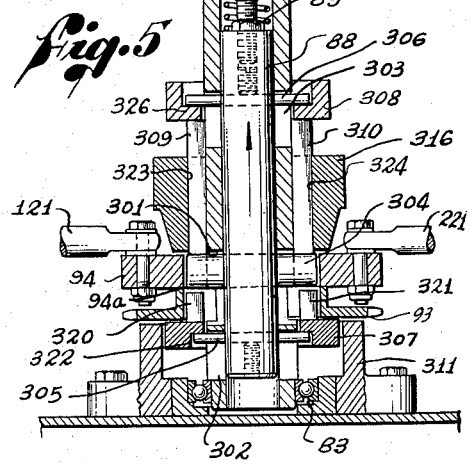
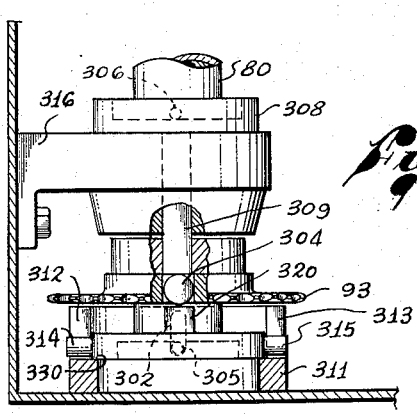
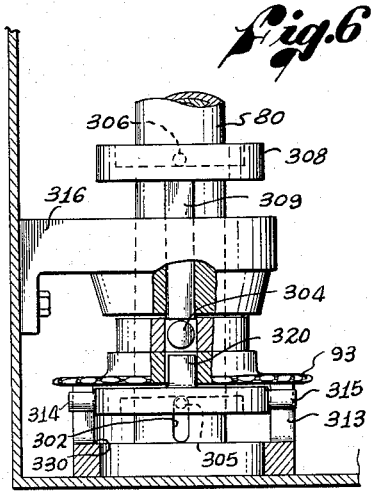
INVENTOR.
JAMES F. KING
BY Edmond F. Shanahan
Attorney Aug. 8, 1961      J. F. KING      2,995,380
CAMERA DOLLY WITH ARCUATE AND CRAB STEERING
Filed July 2, 1957      3 Sheets-Sheet 3
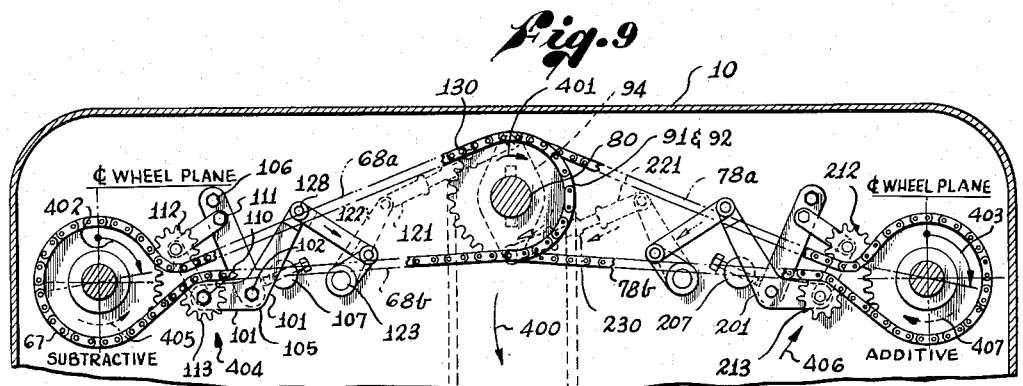
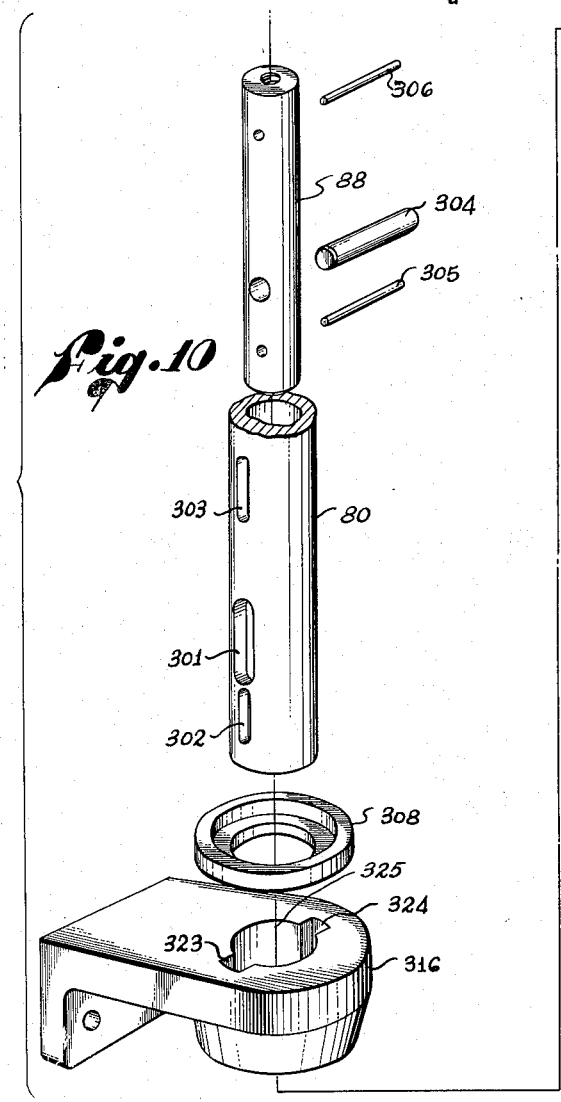
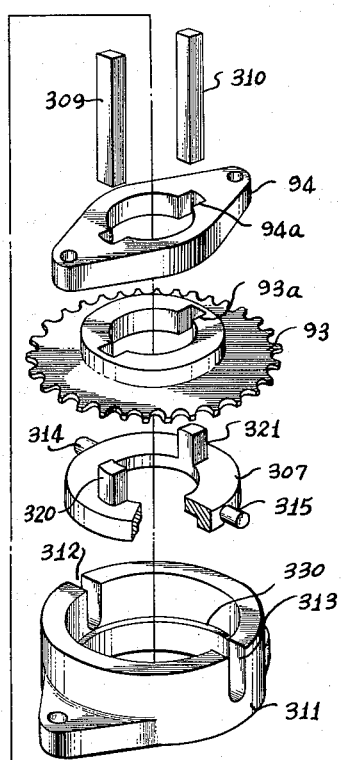
INVENTOR.
JAMES F. KING
BY Edmond F. Shanahan
Attorney

United States Patent Office 2,995,380
Patented Aug. 8, 1961

2,995,380
CAMERA DOLLY WITH ARCUATE AND CRAB STEERING
James F. King, Sherman Oaks, Calif., assignor to Moviola Manufacturing Company, Hollywood, Calif., a corporation of California
Filed July 2, 1957, Ser. No. 669,565
16 Claims. (Cl. 280—91)

This invention relates generally to dolly-type vehicles, such as camera dollies, and more particularly to a dolly in which the four wheels may be oriented for arcuate or crab steering. Crab steering is accomplished by rotating all four wheels in parallel plane relationship, whereas arcuate steering is accomplished by producing different degrees of steering rotation in the wheels of at least one pair. In the present invention, the different relative steering rotation is produced in the arcuate steering pair of wheels by means of a pair of idler systems, one associated with each link chain drive for the arcuate steering wheels, and both idler systems being movable in response to the steering operation.

In motion picture and television photography, it is often necessary to move the camera relative to the subject or scene being photographed or televised, in order to achieve technical and artistic effects. The vehicle for transporting the camera and its elevator support is referred to as a "camera dolly."

It has been the object of all camera dollies to provide great flexibility of movement together with accuracy of steering and reliability over a long period of operation. It has been found, however, that these requirements tend to conflict because mechanisms used to achieve the desired versatility of steering have generally proved to be fragile and prone to failure or maladjustment.

It is necessary to provide a camera dolly with two types of steering, and means for shifting from one to the other. The two types of steering are:

(a) Crab Steering: In this type of movement all four wheels are steered in parallel planes to direct the dolly in straight line movement, sidewise or obliquely with respect to the longitudinal axis of the dolly.

(b) Arcuate Steering: In this type of steering it is necessary for the dolly to travel along the arc of a circle. It is important that the radius of the path of the dolly remain constant, and not vary due to maladjustment of the arcuate steering mechanism.

Many previous camera dollies have attempted to produce arcuate steering by rotating all four wheels through different angles to achieve movement along a circular path of any desired radius, including radii so short that the center of turning was very near or even within the area defined by the four wheels of the dolly. For example, if the center of turning were located at some distance to the left side of the vehicle, the right side wheels would be oriented along the arc of a circle having a radius extending from the center of turning to the verticle axis of steering for the two right wheels. The two left wheels would be oriented on the arc of a circle having a shorter radius, and, therefore, each would be deflected through a somewhat sharper angle, relative to the center line of the dolly, than the right wheels. It will also be understood, that the angle of deflection would be opposite for front and rear wheels. Such steering has required relatively complex construction and has proven difficult to maintain in proper adjustment.

One means for accomplishing precise steering at each of the four whels is to mount each wheel in a caster type of construction with a vertical tracking column journaled in the dolly chassis to permit each of the four wheels to be rotated through 360 degrees about a vertical axis. Also, control of the wheels for purposes of steering may be accomplished conveniently by means of sprockets and link chain drives between the steering system and the tracking columns; the link chains and sprockets, similar to those employed on a bicycle, provide positive drive in either direction with a minimum amount of backlash. However, such chains do experience a certain amount of alteration in length, and may present problems if very precise steering control is required at a point distant from the steering column. In crab steering, the problems presented by changes in the chain are not serious, but in arcuate steering any considerable chain length multiplies problems of adjustment.

In order to accomplish the difference in steering angle for the wheels of a pair which are to be steered arcuately, most previous camera dollies have employed systems which were incapable of adjustment. Also, many arcuate steering systems heretofore known are extremely expensive to manufacture because they require precisely made cams or gear systems.

Another problem encountered in previously known camera dollies and their steering systems, has been that of providing an efficient and positive shifting means for shifting from crab to arcuate steering. It is important that such shifting be accomplished through as simple a linkage as possible, not only to reduce the cost of construction, but to minimize slippage or tendency of the shifting mechanism to become maladjusted.

It is a major object of the present invention to provide a new steering system for camera dollies, in which arcuate steering is accomplished by the steering of only one pair of wheels, the other pair, usually the front wheels, being maintained in a straightforward orientation. It is comprehended within this major object to effect the different steering angles of the arcuately steered wheels by a mechanism which is simple and employs the same driving apparatus used for crab steering.

It is another major object of the invention to steer the arcuately steered wheels through a short link chain system of simple construction, in which a minimum of maladjustment can occur, and which can be provided with simple and reliable adjustment means.

It is still another object of the invention to provide a simple shifting system of positive action, which firmly holds the four wheels in coplanar relationship during crab steering, and which locks the non-arcuately steered wheels in fixed neutral position during arcuate steering.

It is another object of this invention to provide a link chain system for driving the non-arcuately steered wheels by means of a chain extending directly from the steering column to a secondary steering column, and separate lateral link chains from said secondary steering column to each of one pair of wheels, each lateral chain being provided with its own means of adjustment.

The foregoing and other objects of the invention are accomplished by a steering system, which in its preferred form, described in detail herein, employs a vertical tubular steering column, with shifting means reciprocal therein. Also, each of the four wheels of the dolly is driven by the same type of link chain of short lengths extending laterally from a centrally positioned steering column. Arcuate steering is accomplished by means of a pair of idler systems, one on each side of the steering column, which reduce or lengthen each reach of chain between the steering column and an arcuately steered wheel, as required to produce the slight angular difference for arcuate steering.

The construction, operation, and advantages of the invention will best be understood from the following description of a specific embodiment, which is illustrated in the accompanying drawings, in which:

FIGURE 4 is a horizontal sectional view, looking downward, of a fragmentary part of the shifting mechanism, as viewed in the direction of the arrows 4—4 in FIGURE 2;

FIGURE 5 is a vertical transverse sectional view, as seen in the direction of the arrows 5—5 in FIGURE 4;

FIGURE 6 is a side view, partly in section, of the shifting mechanism as seen in the direction of the arrow 6 in FIGURE 4;

FIGURE 7 is a vertical transverse section, corresponding to FIGURE 5, but showing the shifting mechanism shifted to the lowered position, for crab steering;

Figure 3A:
FIGURE 3a is a horizontal sectional view of the front steering compartment as seen looking downward in the same manner as in the view of FIGURE 3.
Figure 3:
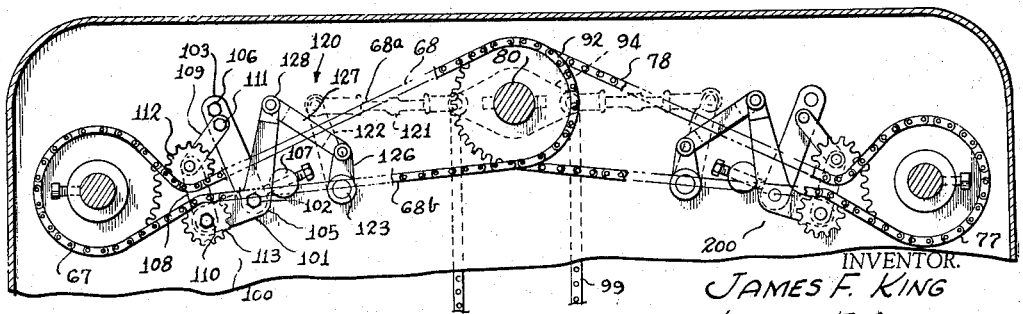
FIGURE 3 is a horizontal sectional view of the rear steering compartment as seen by taking a section in the direction of the arrows 3—3 in FIGURE 2.

FIGURE 8 accompanies FIGURE 7, being a side view, partly in section, taken in the direction of the arrow 8 in FIGURE 7, to show a view of the shifting mechanism in the lowered crab steering position;

FIGURE 9 is a view corresponding to FIGURE 3, but showing the arcuate steering mechanism in operation for steering about a center located to the right of the camera dolly; and FIGURE 10 is an exploded view revealing the principal component parts of the shifting mechanism.

Figure 1:
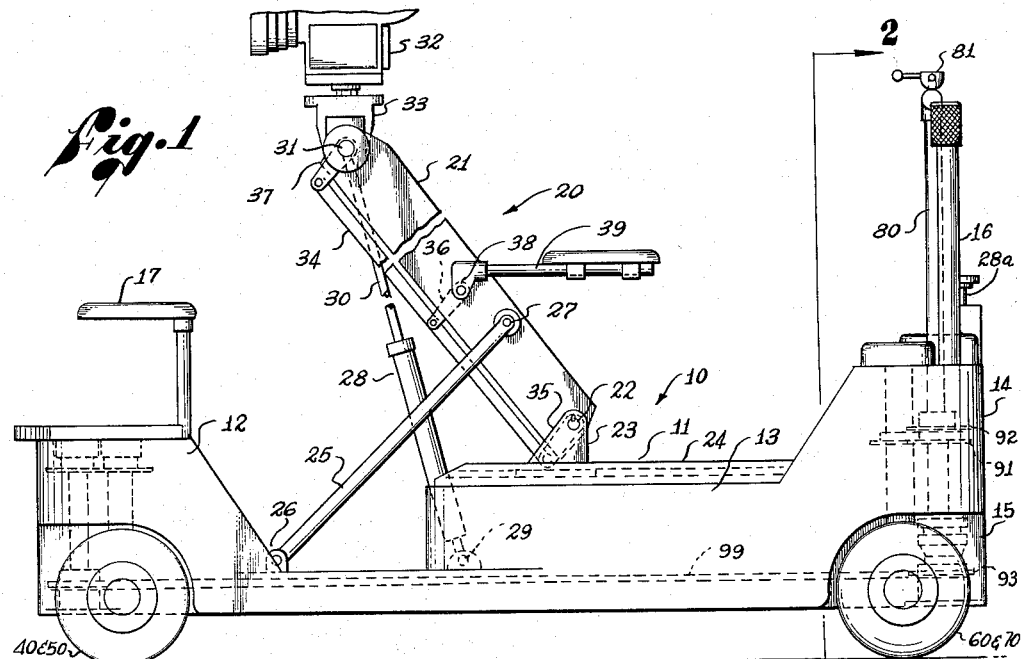
FIGURE 1 is a left side elevation of a camera dolly constructed according to my invention.

In FIGURE 1, the numeral 10 indicates generally a camera dolly including a chassis 11, a camera boom, indicated generally by the numeral 20, and four pairs of rubber tired wheels, the two pair at the front being indicated by the numerals 40 and 50 for right and left sides, respectively, and the two pair at the rear being indicated by the numerals 60 and 70 for the right and left sides, respectively. The chassis 11 includes a front steering compartment 12, a hydraulic system compartment 13, a rear steering compartment 14, and a shifting mechanism compartment 15. The rear end of the dolly 10 is provided with a pair of push handles 16 and the front with a seat 17.

The camera boom 20 is comprised principally of a heavy boom member 21, which is pivotally mounted on a pivot shaft 22 in a sliding member 23, which slides in a track 24 above the hydraulic system compartment 13. The heavy boom member 21 is also supported by a swinging support arm 25, which is pivoted to the chassis 11 at 26 and to the heavy boom member 21 at 27. A hydraulic cylinder 28 is pivoted at its lower end to the camera dolly chassis 29, and at the upper end of its push rod 30 to a cross pin 31 in the upper end of the boom member 21. The cylinder 28 serves to push the boom into any desired position in its loci of elevations; it may be controlled at the rear of the dolly by means of hydraulic valves 28a, through lines and a hydraulic system (not shown) in hydraulic compartment 13.

A camera 32 is supported on a tiltable camera platform 33, which is pivoted on cross pin 31. The tiltable camera platform 33 is maintained in a horizontal position for every position of the boom member 21 by means of a linkage system comprised of a longitudinal link 34, and lower, middle, and upper links 35, 36, and 37. The lower link 35 is carried by the sliding member 23 and keyed at the pivot 22 so as to remain in a relatively fixed position at all times. The middle and upper links 36 and 37 are free to pivot about pins 38 and 31, respectively, so that as the boom 21 is raised, the longitudinal link 34 is caused to move downwards relative to the boom 21 and thus to tilt the camera platform 33 through just the amount of forward angle required to keep it in a horizontal position.

It is convenient to provide a camera operator's seat 39 which is carried on the boom member 21.

The camera boom described in the foregoing paragraphs and illustrated in FIGURE 1, has a combination of advantages not heretofore found in any camera boom. It is important that the camera be elevated in substantially a straight vertical line by the elevation of the boom. However, it is also important that the boom be capable of a maximum distance of adjustment between its highest and lowest point. These two requirements are somewhat in conflict, and the design illustrated presents a unique and practical compromise. By placing the sliding member 23 at an elevation substantially higher than that of the pivot point 26 of the supporting member 25, it is possible to achieve a range of vertical movement substantially greater than could be obtained if the two supports were at the same elevation. The geometry of the boom of FIGURE 1 does not produce perfect vertical movement, but instead moves the camera platform 33 over an arc of a circle. However, the radius of this circle is so large and the arc so flat that it has no adverse effects on the photographic results obtained, and the compromise is more than worth while in terms of the increased vertical movement obtained.

Figure 2:
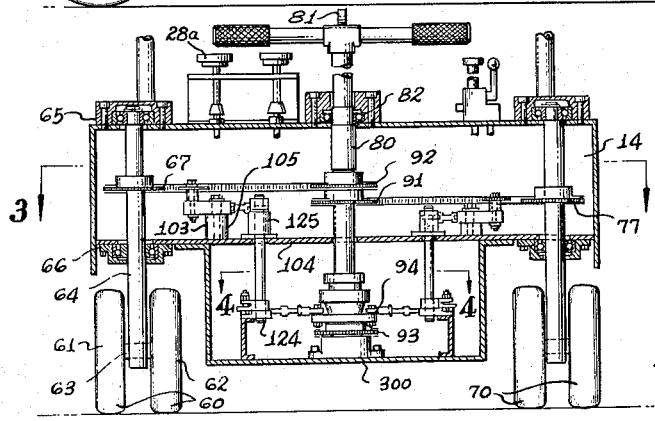
FIGURE 2 is a transverse vertical sectional view of the rear steering compartment as seen in the direction of the arrows 2—2 in FIGURE 1.

The dolly of the illustrated specific embodiment is referred to as a four wheeled dolly, although, in fact, eight small wheels may be seen. However, the wheels are mounted in pairs, and it will be understood that each pair of wheels might be replaced by a single wheel. It is to be understood that each pair of wheels may be referred to as a wheel means, or even as a wheel of the dolly. Preferably, all four wheel means, 40, 50, 60, and 70, are comprised of the same parts and journaled in the same manner in the chassis 11. The right rear wheel means 60, best seen in FIGURE 2, is typical and is comprised of a pair of rubber tired wheels 61 and 62 carried on a short cross shaft 63 which is mounted in the lower end of a vertical column 64, journaled by means of upper and lower ball bearings 65 and 66 in one corner of the dolly chassis 11. In order to clearly distinguish the vertical column 64 from a steering column to be later described, the column 64 will be referred to as a tracking column. However, this is not intended to indicate any limitation as to its form or construction. The term "tracking column" is sometimes applied to caster structures in which the wheels trail behind the vertical axis of rotation of their mounting, but no such limitation is intended here. Indeed, the tracking column 64 of the specific embodiment illustrated is perfectly vertical as are the tracking columns of the other three wheels means 40, 50, and 70.

Each of the tracking columns carries its own steering sprocket, seen as sprockets 67 and 77 in FIGURE 2, and 47 and 57 in FIGURE 3a.

As best seen in FIGURES 1 and 2, steering is accomplished by means of a vertical steering column 80 which is provided at its upper end with a steering cross bar 81, and is journaled in the chassis 11 near the column's upper end at 82, as seen in FIGURE 2, and at its lower end in a bearing 83, as seen in FIGURES 5 and 7.

The steering column 80 is preferably a hollow tube within which a shifting rod 84, best seen in FIGURES 5 and 7, may be vertically shifted into either one of two vertical positions, corresponding to arcuate steering in the raised position (FIGURE 5), and crab steering in the lowered position (FIGURE 7).

Shifting is accomplished by means of a manually operated cam 85 rotatable about a horizontal pin 86 through the upper end of the shifting rod 84, and engaging the surface of a slotted cap 87 at the upper end of the tubular steering column 80 so as to raise or lower the shifting rod 84 as required (see FIGURES 5 and 7, respectively).

The lower end of the rod 84 is threaded to receive a cylindrical shifting member 88, which may be adjustably positioned by means of a nut 89, and which is urged downwardly by a shifting spring 90 to insure positive engagement of the cam 85 with the cam surface cap 87.

The steering column 80 carries a pair of rear steering sprockets 91 and 92, for rear steering wheel means 70 and 60, respectively, which sprockets rotate with the steering column 80 at all times. Also mounted to rotate coaxially with steering column 80 are a front steering sprocket 93 and an arcuate steering cross bar 94, either of which may be selectively engaged by shifting of the shift rod 84 in a manner to be described hereinafter.

The front of the dolly 10 is provided with a secondary steering column 95, as seen in FIGURE 3a, which is provided with a secondary steering sprocket 96, seen in FIGURES 3a and FIGURE 1, and front steering sprockets, seen in dashed outline in FIGURE 1. The sprocket 96 is coupled to turn synchronously with the crab steering sprocket 93 by means of a link chain 99 which extends the length of the chassis 11, under the floor thereof, from the sprocket 93 on the steering column 80 to the front steering sprocket 96 near the bottom end of the secondary steering column 95 at the front of the dolly 10.

Each of the tracking column sprockets 47, 57, 67, and 77 are connected to the steering system by means of associated link chains 48 and 58 for the front wheel means 40 and 50, as seen in FIGURE 3a, and chains 68 and 78 for the wheel means 60 and 70 at the rear of the dolly 10, as seen in FIGURE 3.

Front lateral chain members 48 and 58 may be adjustably tightened by means of sprockets 49 and 59, which are movably adjustable by means of adjustment screws 49a and 59a.

It will be seen that the front wheels 40 and 50 are always in a parallel plane relationship, and are steered in a parallel plane relationship with the rear wheels 60 and 70 to achieve crab steering whenever the crab steering sprocket 93 on the steering column 80 is engaged by the shifting mechanism to be described hereinafter.

The rear wheels 60 and 70 are steered in a parallel plane relationship with each other and with the front wheels 40 and 50 during crab steering, in exactly the same manner as the front wheels, by the steering control transmitted through link chains 68 and 78. However, when the shifting mechanism to be described hereinafter is shifted to arcuate steering, the steering of wheel means 60 and 70 is changed from a parallel plane to an arcuate relationship by means of a pair of movable idler systems indicated generally by the numerals 100 and 200 for the right and left wheel means 60 and 70, respectively.

The two movable idler systems are identical, except opposite in disposition and operation, and may be understood from a detailed description of the idler system 100 which affects the back reach 68a and the front reach 68b of right steering link chain 68. A bell crank 101, see FIGURE 3, is mounted to swing in a horizontal plane about a pivot 102 at its elbow, pivot 102 being journaled in a support 103 swingably mounted on the floor 104 of the rear steering compartment 14. The support 103 swings freely in a horizontal plane at its crank bearing end 105, about a pivot bolt 106 in its opposite end so that support 103 and bell crank 101 together provide a movable support for certain steering sprockets to be described in the next paragraph. An adjustment screw 107, seen in FIGURE 3, may be used to adjust the support 103 at any desired position by moving its swinging end 105 through an angle about the pivot end 106.

A pair of connected mechanical links 108 and 109 are pivotally attached to the crank at 110 and the swinging support at 111, respectively. The link 108 carries a pair of idler sprockets 112 and 113, rotatably mounted at each end, and adapted to engage the reaches 68a and 68b of the link chain 68, respectively.

It will be seen that this arrangement makes it possible to simultaneously increase the length of one reach, while reducing that of the other. When the crank 101 is moved about its pivot 102 in a clockwise direction, as viewed in FIGURES 3 and 9, the two sprockets 112 and 113 move toward the rear of the dolly 10, thus increasing the chain reach 68b between sprocket 67 and sprocket 92, while straightening, and thereby reducing the length of chain reach 68a. This change in the length of reaches 68b and 68a is inevitably accompanied by some counterclockwise rotation of the sprocket 67. Simultaneously, of course, sprocket 77 is being counter-rotated in a similar manner, as will be explained hereinafter.

The movement of crank 101 is controlled by the rotation of the arcuate steering cross bar 94 through an arcuate steering linkage, indicated generally by the numeral 120, and comprised of a link 121, a crank 122, a vertical shaft 123 rotatably supported at bearings 124 and 125, and an upper crank 126 which is pin connected to a link 127, the latter being also pin connected at 128 to the end of the crank 101. In FIGURE 4, it is seen that the link 121 is adjustable in length by means of a threaded midsection 130 which is threadably received on threads of opposite sets and end pieces 131 and 132.

Shifting from arcuate steering to crab steering, or vice versa, is accomplished by rotation of the cam 85 at the upper end of the steering column 80, as previously described. The operative shifting mechanism is housed in the shifting compartment 15 and is indicated in FIGURE 2 by the numeral 300.

The component parts of the shifting mechanism 300, and the disposition which they assume in their raised arcuate steering position, FIGURES 5 and 6, or in their lower crab steering position, FIGURES 7 and 8, may be understood from the following description of FIGURES 5 to 8 and the exploded view of the principal shifting mechanism parts shown in FIGURE 10.

In FIGURE 10 the lower part of the tubular steering column 80 is shown with the shifting cylinder 88 immediately above it. It will be understood, of course, that in actual assembly, the shifting cylinder 88 is reciprocable in the part of the column 80, shown in FIGURE 10, which is provided with three pairs of longitudinal slots, a pair of drive pin slots 301, a pair of lower collar slots 302, and a pair of upper collar slots 303. (Only one slot of each pair is visible in FIGURE 10).

The slots 301, 302, and 303, are provided to accommodate the vertical movement of the projecting ends of a transverse drive pin 304, a lower collar pin 305, and an upper collar pin 306. The drive pin 304 may selectively drive either the arcuate steering cross bar 94 or the crab steering sprocket 93 by movement into their respective key ways 94a or 93a. The function of the lower and upper collars 307 and 308, and the pair of vertically slideable keys 309 and 310 will be explained in connection with FIGURES 5 to 8. The base housing 311 seats the lower end of the tubular steering column 80 in the lower steering column bearing 83, and is also provided with the pair of vertical slots 312 and 313 for receiving a pair of guide pins 314 and 315 on the lower collar 307 so as to prevent the rotation of the latter while permitting its vertical movement.

A central part of the shifting mechanism is rigidly supported and guided by a massive bracket 316 which is mounted on the interior surface of the rear end wall of the shifting compartment 15 as seen in FIGURES 6 and 8.

FIGURE 5 shows the shifting mechanism 300 raised into position for arcuate steering. The cam 85 has been rotated into a position which raises the shifting rod 84, compressing the spring 90, and raising the transverse drive pin 304 into engagement with the key ways 94a of the arcuate steering cross bar 94, seen in section in FIGURE 5, thus driving the cross bar 94 in rotation integrally with the steering column 80.

At the same time, the lower collar 307 is lifted to its upper position so that it engages the key way 93a (see FIGURE 10) in crab steering sprocket 93 by means of a pair of upwardly projecting locking keys 320 and 321, which prevent the crab steering sprocket from undergoing any rotation during arcuate steering. Thus, the frontw heel means 60 and 70 are held in straightforward alignment of the dolly chassis 11. It will be noted that the lifting pin 305 engages the lower collar 307 under an annular shoulder 322 so that rotation of the steering column 80 is not hindered.

It will also be noted that the two keys 309 and 310 are supported in a raised position in the key ways 323 and 324 in the bore 325 of the supporting bracket 316, so that they do not engage the key ways 94a of the arcuate steering cross bar 94.

In the position shown in FIGURE 5, the upper collar 308 is supported on the upper ends of the keys 309 and 310. The upper collar pin 306 engages the upper collar 308 above an annular shoulder 326 so that rotation of the steering column 80 is not hindered.

When the shifting mechanism 300 is lowered into crab steering position, its parts assume the disposition shown in FIGURES 7 and 8. It is seen that the cam 85 has been rotated clockwise through an angle of about 120 degrees to bring its flat surface 81a against the cam-engaging surface of steering column cap 87, thus lowering the shift rod 84 and the shifting cylinder 88. It is seen that the lower collar 307 has dropped into its lower position on the internal annular shoulder 330 of the base member 311. If, for any reason, the lower collar 307 failed to drop freely, it would be pushed down into its lower position by the drive pin 304, which downwardly displaces the locking keys 320 and 321 from the key ways 93a of the crab steering sporcket 93. Thus, the crab steering sprocket 93 is rotated integrally with the steering column 80 to produce crab steering by the parallel plane rotation of all four wheel means 40, 50, 60, and 70. At the same time, any unwanted rotation of the arcuate steering cross bar 94 is prevented by the keys 309 and 310, which drop into a lower position, or are pushed down by upper collar 308, so as to lock a cross bar 94 to the bracket member 316, in the key ways 323 and 324 of which the vertically sliding keys 309 and 310 vertically slide.

In arcuate steering operation, while the front wheels are locked in a straightforward position, as already described, the two rear wheel means 60 and 70 are rotated through slightly different angles by virtue of the operation of the two idler systems 100 and 200. An example of such operation is illustrated in FIGURE 9 which shows the manner in which the clockwise steering rotation of the right rear wheels 60, seen in phantom, is reduced, and that of the left rear wheels 70, also seen in phantom, is increased in order to provide arcuate steering about a center far to the left of the dolly 10, as indicated approximately by the arc-shaped arrow 400. It is seen that the rotation of the wheel means 60 is reduced in angle, since it corresponds to movement along the arc of a circle of greater circumference than that along which the steering column 80 is moving. On the other hand, the angle through which the left wheel means 70 is rotated is substantially increased, since the radius of the circle along which it must travel is less than that of the circle of travel of the steering column 80.

The relative movement of the parts, in order to achieve the arcuate travel along the arc roughly indicated by the arrow 400, is indicated by the arrows associated with the various parts. The steering column 80 and the two rear steering sprockets 91 and 92 have been rotated through approximately a 90 degree clockwise angle, as indicated by the arrows 401. This rotation produces a tendency to rotate 90 degrees in a clockwise direction in both the wheel means 60 and the wheel means 70, as indicated by the direction of the arrows 402 and 403, respectively. However, it will be noted that these two arrows are different in length because of the arcuate steering effect.

The rotation of the cross bar member 94 pulls both the right and left links 121 and 221, respectively, in an inward direction, causing both bell cranks 101 and 201 to rotate inwardly, the former in a clockwise direction, and the latter in a counterclockwise direction. The idlers 112 and 113 in the right idler section shift rearward, as indicated by the arrow 404, thus increasing the reach of 68b and reducing 68a to achieve the required subtractive effect indicated by the dashed arrow 405. On the left side the rearward shift of the idlers 212 and 213, in the direction of the arrow 406, lengthens reach 78b and shortens chain reach 78a, producing the required additive rotation, indicated in direction by the dashed arrow 407. Suitable arcuate steering performance may be assured by adjusting adjustment screws 107 and 207, and threaded members 130 and 230, in a system constructed of parts of proper dimensions.

While the foregoing has been described in particular connection with camera dollies, it will be understood that the novel form of steering may be applied to vehicles designed for any purpose, if arcuate steering or arcuate and crab steering is required. Also, the specific embodiment of the foregoing description has been presented in detail in order to show a preferred form of the invention, but without any intention of restricting the scope of the invention to the particular details illustrated. It will be obvious that those familiar with the art may make many modifications and changes without departing from the spirit of the invention or the scope of the following claims.

1. A dolly for moving in either crab or arcuate steering, which includes: a dolly chassis; a pair of steering wheel means and other wheel means for transporting said chassis; a steering column rotatable in said chassis; a pair of sprockets on said steering column; a sprocket on each of said steering wheel means; a pair of link chains, one between each of said wheel means sprockets and the corresponding sprocket on said steering column; an arcuate steering system associated with each of said link chains, each of said systems including a movable support, a pair of chain engaging means mounted on said support, one of said chain engaging means for each reach of said link chains, and a pair of linkage means, one for moving each of said supports in response to rotation of said steering column, crab steering means associated with said steering column for producing parallel plane rotation of all wheel means of said dolly; and shifting means for selectively engaging said crab steering means or engaging said arcuate steering systems to produce crab or arcuate steering, respectively.

2. A dolly for moving in either crab or arcuate steering, which includes: a dolly chassis; a pair of steering wheel means and other wheel means for transporting said chassis; a steering column rottatable in said chassis; a pair of sprockets on said steering column; a sprocket on each of said steering wheel means; a pair of link chains, one between each of said wheel means sprockets and the corresponding sprocket on said steering column; an arcuate steering system associated with each of said link chains, each of said systems including a movable support, a pair of chain engaging means mounted on said support, each of said chain engaging means engaging one reach of one of said link chains, and linkage means between said steering column and said support for moving said support in opposite directions in response to rotation of said column; crab steering means associated with said steering column for producing coplanar rotation of all wheel means of said dolly; and shifting means associated with said steering column for selectively engaging said crab steering means while holding said arcuate steering systems in a neutral position, or engaging said arcuate steering systems while holding said crab steering means in a neutral position, to produce crab or arcuate steering, respectively.

3. A four wheel dolly for moving in either crab or arcuate steering, which includes: a dolly chassis; four wheel means for transporting said chassis; a steering column rotatable in said chassis; a pair of sprockets on said steering column; a pair of corresponding sprockets on an adjacent pair of said wheel means; a pair of link chains, one between each of said wheel means sprockets and the corresponding sprocket on said steering column; an idler system associated with each of said link chains, each of said systems being comprised of movable idler support means, a pair of idler sprockets rotatably mounted on said support means, each of said idler sprockets engaging one reach of one of said link chains, and means between said steering column and said supports for rotating said support means in response to rotation of said column; crab steering means associated with said steering column for producing coplanar rotation of the two wheel means other than those associated with said aforementioned idler systems; and means associated with said steering column for selectively engaging said crab steering means while holding said idler systems in a neutral position, or engaging said idler systems while holding said crab steering means in a neutral position to produce crab or arcuate steering, respectively.

4. A dolly for moving in either crab or arcuate steering, which includes: a dolly chassis; four wheel means for transporting said chassis, each of said wheel means including a vertical tracking column journaled in said chassis; a vertical steering column journaled in said chassis; a pair of sprockets on said steering column; a pair of corresponding sprockets, one on each tracking column of one pair of adjoining wheel means; a pair of link chains, one between each of said steering column sprockets and the corresponding sprocket on one of said tracking columns; an idler system associated with each of said link chains, each of said systems being comprised of a movable idler support pivotally mounted on a vertical axis, a pair of idler sprockets rotatably mounted on said idler support, each of said idler sprockets laterally engaging one reach of one of said link chains, and mechanical linkage means for rotating said idler supports in opposite directions in response to rotation of said steering column, a crab steering sprocket mounted concentrically with said steering column; chain and sprocket means between said crab steering sprocket and the tracking columns of the pair of wheel means other than the pair associated with said aforementioned idler systems to turn said wheel means in coplanar relationship in response to rotation of said crab steering sprocket; and means for selectively coupling to the rotation of said steering column either said idler systems while holding said crab steering sprocket in fixed forward position, or said crab steering sprocket while holding said idler systems in a position corresponding to coplanar rotation of their associated pair of wheel systems, to produce crab or arcuate steering, respectively.

5. A dolly for moving in either crab or arcuate steering, which includes: a dolly chassis; four wheel means for transporting said chassis, each of said wheel means including a vertical tracking column journaled in said chassis; a vertical steering column journaled in said chassis; a pair of sprockets on said steering column; a pair of corresponding sprockets, one on each tracking column of one pair of adjoining wheel means; a pair of link chains, one between each of said steering column sprockets and the corresponding sprocket on one of said tracking columns; an idler system associated with each of said link chains, each of said systems being comprised of a movable idler support pivotally mounted on a vertical axis, a pair of idler sprockets rotatably mounted on said idler support, each of said idler sprockets laterally engaging one reach of one of said link chains, and adapted to lengthen one reach while simultaneously shortening the other; mechanical linkage means for oppositely rotating said idler supports in response to rotation of said steering column; a crab steering sprocket mounted concentrically with said steering column; chain and sprocket means between said crab steering sprocket and the tracking columns of the pair of wheel means other than the pair associated with said aforementioned idler systems to turn said wheel means in coplanar relationship in response to rotation of said crab steering sprocket; shifting means vertically reciprocable within said steering column; and transverse drive pin means associated with said shifting means and projecting through vertical slots in said column to selectively engage either said idler linkage means or said crab steering sprocket.

6. A dolly for moving in either crab or arcuate steering, which includes: a dolly chassis; a pair of crab-steering wheel means at one end of said chassis, each of said wheel means including a vertical tracking column journaled in said chassis; a pair of crab-arcuate-steering wheel means at the opposite end of said chassis, each of said wheel means including a vertical tracking column journaled in said chassis; a tracking column sprocket on each of said tracking columns; a vertical tubular steering column journaled in said chassis; a pair of fixed sprockets mounted on said steering column and rotatable therewith; a pair of link chains between said steering column sprockets and the tracking column sprockets on said crab-arcuate-steering tracking columns; a cross-bar member rotatable with said steering column; an idler system associated with each of said link chains, each of said systems being comprised of a crank means pivotal in said chassis about a vertical axis, idler support means movable laterally to engage the reaches of said link chain by said crank means, a pair of idler sprockets rotatably mounted on said idler support, each of said idler sprockets laterally engaging one reach of said link chain, linkage means from said crank means to said cross-bar member for rotating said crank in response to rotation of said column, and adjustment means in said idler support system for adjusting the position of said idler sprockets relative to the angle of rotation of said steering column; a crab-steering sprocket rotatable on said steering column and adapted to couple both of said idler system linkage means to said column to produce crab-steering; shifting rod means vertically reciprocable within said tubular steering column; transverse drive pin means carried by said shifting rod means and extending through at least one vertical slot in said steering column to selectively engage either said cross-bar member or said crab-steering sprocket; and a link chain system between said crab-steering sprocket and said tracking column sprockets on said crab-steering wheel means to turn said wheel means in coplanar relationship to produce crab steering.

7. A dolly for moving in either crab or arcuate steering, which includes: a dolly chassis; a pair of crab-steering wheel means at one end of said chassis, each of said wheel means including a vertical tracking column journaled in said chassis; a pair of crab-arcuate-steering wheel means at the opposite end of said chassis, each of said wheel means including a vertical tracking column journaled in said chassis; a tracking column sprocket on each of said tracking columns; a vertical tubular steering column journaled in said chassis; a pair of fixed sprockets mounted on said steering column and rotatable therewith; a pair of link chains between said steering column sprockets and the tracking column sprockets on said crab-arcuate-steering tracking columns; a cross-bar member rotatable with said steering column; an idler system associated with each of said link chains, each of said systems being comprised of a crank means pivotal in said chassis about a vertical axis, idler support means movable laterally to engage the reaches of said link chain by said crank means, a pair of idler sprockets rotatably mounted on said idler support, each of said idler sprockets laterally engaging one reach of said link chain, linkage means from said crank means to said cross-bar member for rotating said crank in response to rotation of said column, and adjustment means in said idler support system for adjusting the position of said idler sprockets relative to the angle of rotation of said steering column; a crab-steering sprocket rotatable on said steering column and adapted to couple both of said idler system linkage means to said column to produce crab-steering; shifting rod means vertically reciprocable within said tubular steering column; transverse drive pin means carried by said shifting rod means and extending through at least one vertical slot in said steering column to selectively engage either said cross-bar member or said crab-steering sprocket; a link chain system between said crab-steering sprocket and said tracking column sprockets on said crab-steering wheel means to turn said wheel means in coplanar relationship to produce crab steering; and locking means vertically reciprocable by said shifting means to lock selectively either said crab-steering sprocket in straight-forward position during arcuate steering, or said cross-bar member in coplanar position during crab steering.

8. A dolly for moving in either carb or arcuate steering, which includes: a dolly chassis; a pair of crab-steerable wheel means at one end of said chassis, each of said wheel means including a vertical tracking column journaled in said chassis; a pair of crab-arcuate-steerable wheel means at the opposite end of said chassis, each of said last-mentioned wheel means including a vertical tracking column journaled in said chassis; a tracking column sprocket on each of said tracking columns; a vertical tubular steering column journaled in said chassis near said crab-arcuate-wheel means; a pair of steering column sprockets mounted on said tubular steering column and rotatable therewith; a pair of link chains, one of each of said chains being disposed between one of said steering column sprockets and the tracking column sprocket of one of said crab-arcuate-steerable wheel means; a crab-steering means freely received on said steering column and independently rotatable around the same axis; link chain means extending between said crab-steering means and said crab-steerable wheel means; an idler system associated with each of said link chains engaging each of said crab-arcuate steerable wheel means, each of said systems being comprised of a pair of idler sprockets, one engaging each reach of said link chain, movable idler support means, said idler sprockets being carried on said idler support means; an arcuate steering means received on said steering column and freely rotatable independently thereof, said arcuate steering means engaging at diametrically opposite points one of said idler systems; a shift member vertically reciprocable within said steering column; a drive pin means transversely received in said shifting member and extending through longitudinal slots in the side walls of said steering column, and adapted to selectively engage either said crab steering means or said arcuate steering cross bar member; vertically movable key means for locking said crab steering sprocket during arcuate steering; a second pair of key means for locking said arcuate steering means during crab steering; and means integrally attached to said dolly chassis for preventing the rotation of said two pairs of key means.

9. A dolly for moving in either crab or arcuate steering, which includes: a dolly chassis; a pair of crab-steerable wheel means at one end of said chassis, each of said wheel means including a vertical tracking column journaled in said chassis; a pair of crab-arcuate-steerable wheel means at the opposite end of said chassis, each of said last-mentioned wheel means including a vertical tracking column journaled in said chassis; a tracking column sprocket on each of said tracking columns; a vertical tubular steering column journaled in said chassis near said crab-arcuate-wheel means; a secondary steering column journaled in said chassis near said crab-steerable wheel means; a pair of steering column sprockets mounted on said tubular steering column and rotatable therewith; a pair of link chains, one of each of said chains being disposed between one of said steering column sprockets and the tracking column sprocket of one of said crab-arcuate-steerable wheel means; a pair of secondary steering column sprockets mounted on said secondary steering column and rotatable therewith; a pair of link chains, one of said link chains being disposed between one of said secondary steering column sprockets and a tracking column sprocket on one of said crab-steerable wheel means; a secondary steering column sprocket on said secondary steering column and rotatable therewith; a crab-steering sprocket freely received on said steering column and independently rotatable around the same axis; a link chain means extending between said crab-steering sprocket and said secondary steering column driving sprocket; an idler system associated with each of said link chains engaging each of said crab-arcuate steerable wheel means, each of said systems being comprised of an idler support means pivotal about a vertical axis at one end, a bell crank means pivotally carried on the swinging end of said support means and adapted to rotate in a horizontal plane, linkage idler support means associated with said bell crank means and said swinging support means, a pair of idler sprockets, one engaging each reach of said link chain, said idler sprockets being carried on said idler support linkage means, and mechanical linkage means between said bell crank and location of said steering column, said linkage means including at least one link adjustable in length; a pair of adjustment means, each one of said pair engaging one of said support means to adjust the angle thereof; an arcuate steering cross bar member received on said steering column and freely rotatable independently thereof, said cross bar member being connected at diametrically opposite points to one of said linkage operating members for operating said idler systems; a shift rod vertically reciprocable within said steering column; a shifting cam rotatable in a vertical plane at the upper end of said shift rod and engaging the upper end of said steering column to hold said shift rod in a raised or lowered position; a shifting member received on the lower end of said shift rod and longitudinally adjustable relative thereto; a drive pin transversely received in said shifting member and extending through longitudinal slots in the side walls of said steering column, and adapted to selectively engage either said crab steering sprocket or said arcuate steering cross bar member; vertically movable key means for locking said crab steering sprocket during arcuate steering; a second pair of key means for locking said arcuate steering cross bar during crab steering; and means integrally attached to said dolly chassis for preventing the rotation of said two pairs of key means.

10. A dolly for moving in either crab or arcuate steering, which includes: a dolly chassis; a pair of crab-steerable wheel means at one end of said chassis, each of said wheel means including a vertical tracking column journaled in said chassis; a pair of crab-arcuate-steerable wheel means at the opposite end of said chassis, each of said last-mentioned wheel means including a vertical tracking column journaled in said chassis; a tracking column sprocket on each of said tracking columns; a vertical tubular steering column journaled in said chassis near said crab-arcuate-wheel means; a secondary steering column journaled in said chassis near said crab-steerable wheel means; a pair of steering column sprockets mounted on said tubular steering column and rotatable therewith; a pair of link chains, one of each of said chains being disposed between one of said steering column sprockets and the tracking column sprocket of one of said crab-arcuate-steerable wheel means; a pair of secondary steering column sprockets mounted on said secondary steering column and rotatable therewith; a pair of link chains, one of said link chains being disposed between one of said secondary steering column sprockets and a tracking column sprocket on one of said crab-steerable wheel means; a secondary steering column sprocket on said secondary steering column and rotatable therewith; a crab-steering sprocket freely received on said steering column and independently rotatable around the same axis; a link chain means extending between said crab-steering sprocket and said secondary steering column driving sprocket; an idler system associated with each of said link chains engaging each of said crab-arcuate steerable wheel means, each of said systems being comprised of an idler support means pivotal about a vertical axis at one end, a bell crank means pivotally carried on the swinging end of said support means and adapted to rotate in a horizontal plane, linkage idler support means associated with said bell crank means and said swinging support means, a pair of idler sprockets, one engaging each reach of said link chain, said idler sprockets being carried on said idler suport linkage means, and mechanical linkage means between said bell crank and location of said steering column, said linkage means including at least one link adjustable in length; a pair of adjustment means, each one of said pair engaging one of said support means to adjust the angle thereof; an arcuate steering cross bar member received on said steering column and freely rotatable independently thereof, said cross bar member being connected at diammetrically opposite points to one of said linkage operating members for operating said idler systems; a shift rod vertically reciprocable within said steering column; a shifting cam rotatable in a vertical plane at the upper end of said shift rod and engaging the upper end of said steering column to hold said shift rod in a raised or lowered position; a shifting member received on the lower end of said shift rod and longitudinally adjustable relative thereto; a drive pin transversely received in said shifting member and extending through longitudinal slots in the side walls of said steering column, and adapted to selectively engage either said crab steering sprocket or said arcuate steering cross bar member; vertically movable key means for locking said crab steering sprocket during arcuate steering; collar means associated with said crab steering locking key means, collar operating means associated with said shifting means to move said collar means and urge said key means into locking position; a second pair of key means for locking said arcuate steering cross bar during crab steering; collar means associated with said second pair of key means for urging said second pair of key means into locking position; and a second collar operating means associated with said shifting means for urging said second collar means to urge said second pair of key means into locking position; and means integrally attached to said dolly chassis for preventing the rotation of said two pairs of key means.

11. A combination as described in claim 10 which includes vertically adjustable shifting means associated with said shift rod.

12. A combination as described in claim 10 which includes a pair of transverse collar operating pins in said shifting means, said pins having ends extending longitudinal vertical slots in said tubular steering column and engaging said collars.

13. A combination as described in claim 10 in which each of said idler operating linkages includes a link of adjustable length extending from one end of said arcuate steering cross bar means, a lever member pivotally connected to the end of said adjustable link and rotating a vertical shaft; an operating lever horizontally extending from the upper end of said vertical shaft; and a link pivotally connected at each end extending between said upper lever and one end of said bell crank.

14. An arcuate-steering dolly which includes: a dolly chassis; a pair of steerable wheel means supported in said dolly chassis, said steerable wheel means being independently steerable about an axis normal to their axis of rolling rotation; a steering column rotatable in said chassis; a pair of sprockets on said steering column; a sprocket on each of said steerable wheel means for producing steering rotation; a pair of link chains, one between each of said wheel mean sprockets and a corresponding sprocket on said steering column; a pair of idler supports, one of said supports being movably mounted in said dolly chassis near each of said link chains; a pair of chain engaging idlers mounted on each of said idler supports, one of said idlers engaging each reach of the adjacent link chain; and idler support moving means simultaneously and oppositely moving said idler supports in response to rotation of said steering column.

15. An arcuate-steerable dolly which includes: a dolly chassis; four wheel means for transporting said chassis, at least two of said wheel means including a vertical tracking column journaled in said chassis; a vertical steering column journaled in said chassis; a pair of sprockets on said steering column; a pair of corresponding sprockets, one on each of said two tracking columns; a pair of link chains, one between each of said steering column sprockets and the corresponding sprocket on one of said tracking columns; a pair of idler supports mounted in said dolly chassis and rotatable about a vertical axis, one of said idler supports being located adjacent each of said link chains; a pair of idlers mounted on each of said idler supports, one of said pair for each reach of the adjacent link chain; and means rotative with said steering column for imparting opposite rotational movement to said idler supports about their respective axes.

16. A dolly for moving in either crab or arcuate steering, which includes: a dolly chassis; a pair of steering wheel means and other wheel means for transporting said chassis; a steering column rotatable in said chassis; a pair of sprockets on said steering column; a sprocket on each of said steering wheel means; a pair of link chains, one between each of said steering wheel means sprockets and the corresponding sprocket on said steering column; an arcuate system associated with said link chains including a pair of movable supports; a pair of chain engaging means mounted on each of said supports, one of said chain engaging means for each reach of said link chains; a pair of means, one for moving each of said supports in response to rotation of said steering column; crab steering means associated with said steering column for producing parallel plane rotation of all wheel means of said dolly; and shifting means for selectively engaging said crab steering means or engaging said arcuate steer-system to produce crab or arcuate steering, respectively.

References Cited in the file of this patent

UNITED STATES PATENTS

| | | |
|---|---|---|
| Re. 21,388 | De Vry | Mar. 12, 1940 |
| 613,960 | Bigelow | Nov. 8, 1898 |
| 1,801,043 | Harber et al. | Apr. 14, 1931 |
| 2,228,247 | Cunningham | Jan. 14, 1941 |
| 2,470,496 | Krilanovich | May 17, 1949 |
| 2,715,534 | Hoge et al. | Aug. 16, 1955 |
| 2,834,605 | McCollough | May 13, 1958 |
| 2,842,376 | Krilanovich | July 8, 1958 |